United States Patent
Inaba

(10) Patent No.: US 7,362,665 B2
(45) Date of Patent: Apr. 22, 2008

(54) SEEK METHOD OF OPTICAL DISKS AND OPTICAL STORAGE DEVICE

(75) Inventor: Seiji Inaba, Yokohama (JP)

(73) Assignee: Hitachi-LG Data Storage, Inc., Tokyo (JP)

(*) Notice: Subject to any disclaimer, the term of this patent is extended or adjusted under 35 U.S.C. 154(b) by 786 days.

(21) Appl. No.: 10/804,967

(22) Filed: Mar. 18, 2004

(65) Prior Publication Data
US 2005/0030839 A1 Feb. 10, 2005

(30) Foreign Application Priority Data
Aug. 8, 2003 (JP) ............................. 2003-206693

(51) Int. Cl.
*G11B 7/085* (2006.01)
(52) U.S. Cl. .................. 369/30.03; 369/53.25
(58) Field of Classification Search ............ 369/30.03, 369/30.1, 30.11, 30.12, 30.13, 30.14, 30.16, 369/30.17, 53.25
See application file for complete search history.

(56) References Cited

U.S. PATENT DOCUMENTS

| | | | |
|---|---|---|---|
| 6,061,308 A * | 5/2000 | Nakamizo ................. | 369/30.04 |
| 6,442,109 B1 * | 8/2002 | Iida .......................... | 369/30.14 |
| 6,529,451 B2 * | 3/2003 | Yoshimoto et al. ....... | 369/30.03 |
| 6,541,186 B2 * | 4/2003 | Sato et al. .................. | 430/321 |
| 2001/0055246 A1 * | 12/2001 | Okamoto et al. ......... | 369/30.16 |
| 2004/0001397 A1 * | 1/2004 | Jeong et al. .............. | 369/30.11 |
| 2004/0081430 A1 * | 4/2004 | Lee et al. ..................... | 386/70 |

FOREIGN PATENT DOCUMENTS

| | | |
|---|---|---|
| JP | 11-306701 | 11/1999 |
| JP | 2001-351311 | 12/2001 |

\* cited by examiner

*Primary Examiner*—Ali Neyzari
(74) *Attorney, Agent, or Firm*—Townsend and Townsend and Crew LLP

(57) ABSTRACT

An optical disk includes a first area, a second area having time information undistinguishable from time information of the first area and a third area having unique time information. The third area is divided into a plurality of sub-areas. Peculiar zone numbers are assigned to zones each representing the first area, the second area or any of the sub-areas and recorded in an associative-relation table memory for a management purpose. A zone number assigned to a zone of the present position of an optical pickup or a zone number assigned to a zone of a target position serving as a seek destination of the optical pickup is stored in a zone-number-storing memory for the purpose of managing the position of the optical pickup. Before a seek operation is carried out to move the optical pickup, a zone number stored in the zone-number-storing memory as a zone number assigned to a zone of the present position of the optical pickup is first changed to a zone number assigned to a zone of a target position serving as a seek destination of the optical pickup and, then, the seek operation is actually implemented to move the optical pickup to the zone identified by the newly stored zone number.

12 Claims, 11 Drawing Sheets

FIG. 6

| MINUTES | | | SECONDS | | | FRAMES | |
|---|---|---|---|---|---|---|---|
| BINARY | BCD | | BCD | BCD | | BCD | BCD |
| ------ | ------ | | ------ | ------ | | ------ | ------ |
| 9 | 9 | | 5 | 9 | | 7 | 3 |
| 9 | 9 | | 5 | 9 | | 7 | 4 |
| A | 0 | | 0 | 0 | | 0 | 0 |
| A | 0 | | 0 | 0 | | 0 | 1 |
| ------ | ------ | | ------ | ------ | | ------ | ------ |

SEEK METHOD OF OPTICAL DISKS AND OPTICAL STORAGE DEVICE

FIELD OF THE INVENTION

The present invention relates to an optical storage device that seeks for a desired position on an optical disk.

BACKGROUND OF THE INVENTION

CD-R and CD-RW disks have absolute-time information called ATIP (Absolute Time In Pregroove) time information in a guide groove known as a pregroove. In addition to the ATIP time information itself, area discrimination information for distinguishing a lead-in area, a data area and other areas from each other is also recorded.

In the conventional seek operation, the present position is compared with a seek-target position for confirmation of the seek-target position on the basis of the ATIP time information.

It is to be noted that Page 3 of Japanese Patent Laid-open No. 2001-351311 discloses that data is read out and written from and onto a writable optical disk while this ATIP (Absolute Time In Pregroove) time information is read out from the pregroove.

In addition, the abstract of Japanese Patent Laid-open No. 11-306701 discloses a configuration for detecting rotational phenomenon of a stepping motor serving as a slide motor of an optical pickup of the optical storage device. (Hereinafter, it is solely called "irregularity phenomenon".)

Recently, CD-R and CD-RW disks are made available in the market as disks each having a total data area with a size equivalent to a recording time period of at least 80 minutes. In these optical disks, however, the format of the ATIP time information does not include margin bits for particularly indicating the total data area with a size equivalent to a recording time period of at least 80 minutes. Thus, the ATIP time information of the lead-in area cannot be distinguished from that of the total data area with a size equivalent to a recording time period of at least 80 minutes.

For the above reason, with the conventional way of carrying out a seek operation, a seek operation based on ATIP time information cannot be implemented. Therefore, in the conventional way of carrying out a seek operation, inevitably, only a write operation can be started from a data-area location inside a region with a size equivalent to a recording time period smaller than 80 minutes and continued to a data-area location outside the region with a size equivalent to a recording time period smaller than 80 minutes in the operation of an over-burn function.

It is thus an object of the present invention to provide a seek method of seeking a position in a first, a second, and a third area included in an optical disk, in which the first area has time information, the second area has time information undistinguishable from the time information of the first area, and the third area has unique time information, as well as provide an optical storage device.

It is another object of the present invention to provide an optical disk seek method of avoiding a malfunction occurring in a seek operation due to an irregularity phenomenon as well as an optical storage device.

SUMMARY OF THE INVENTION

In accordance with an aspect of the present invention, there is provided an optical storage device comprising:

an optical pickup for radiating a light beam to an optical disk, the optical disk including:

a first area having first time information;

a second area provided on a circumference on the outer side of the first area as an area having second time information undistinguishable from the first time information; and a third area provided between the first and second areas as an area having third time information distinguishable from the first time information and the second time information; and a control unit for controlling the movement of the optical pickup over the optical disk in the radial direction of the optical disk;

wherein, in order to move the optical pickup from the first area to the second area, the control unit first moves the optical pickup from the first area to the third area, then, the control unit confirms the fact that the optical pickup has been moved out from the first area to the third area and, finally, the control unit moves the optical pickup from the third area to the second area.

In addition, in accordance with another aspect of the present invention, there is provided an optical storage device comprising:

an optical pickup for radiating a light beam to an optical disk, the optical disk including:

a first area having first time information;

a second area provided on a circumference on the outer side of the first area as an area having second time information undistinguishable from the first time information; and a third area provided between the first and second areas as an area having third time information distinguishable from the first time information and the second time information; and a control unit for controlling the movement of the optical pickup over the optical disk in the radial direction of the optical disk;

wherein, in order to move the optical pickup from the second area to the first area, the control unit first moves the optical pickup from the second area to the third area, then, the control unit confirms the fact that the optical pickup has been moved out from the second area to the third area and, finally, the control unit moves the optical pickup from the third area to the first area.

Preferably, the control unit confirms the fact that the optical pickup has been moved to the third area on the basis of the fact that the second time information has been read out by the optical pickup.

In accordance with the present invention, it is thus possible to provide an optical disk, which includes a first area, a second area having time information undistinguishable from time information of the first area and a third area having unique time information, with a seek method of seeking for a position in the optical disk and to provide an optical storage device implementing the seek method. In addition, in accordance with the present invention, it is also possible to provide an optical disk with a seek method capable of avoiding a malfunction occurring in a seek operation malfunction due to an above mentioned irregularity phenomenon and to provide an optical storage device implementing the seek method.

BRIEF DESCRIPTION OF THE DRAWINGS

FIG. 6 is a diagram showing a way to convert ATIP time information expressed in the conventional BCD format into ATIP time information expressed in a binary format as ATIP time information for a recording time beyond a recording time period of 100 minutes;

DESCRIPTION OF THE PREFERRED EMBODIMENTS

An optical storage device implemented by any embodiment of the present invention has absolute time information called ATIP (Absolute Time In Pregroove) time information in a guide groove known as a pregroove. In addition, the optical storage device is capable of seeking for a position on a CD-R or CD-RW disk having a total data area with a size equivalent to a recording time period of at least 80 minutes. The CD-R and CD-RW disks are each referred to hereafter simply as a disk having a total data area with a size equivalent to a recording time period of at least 80 minutes.

Figure 1:
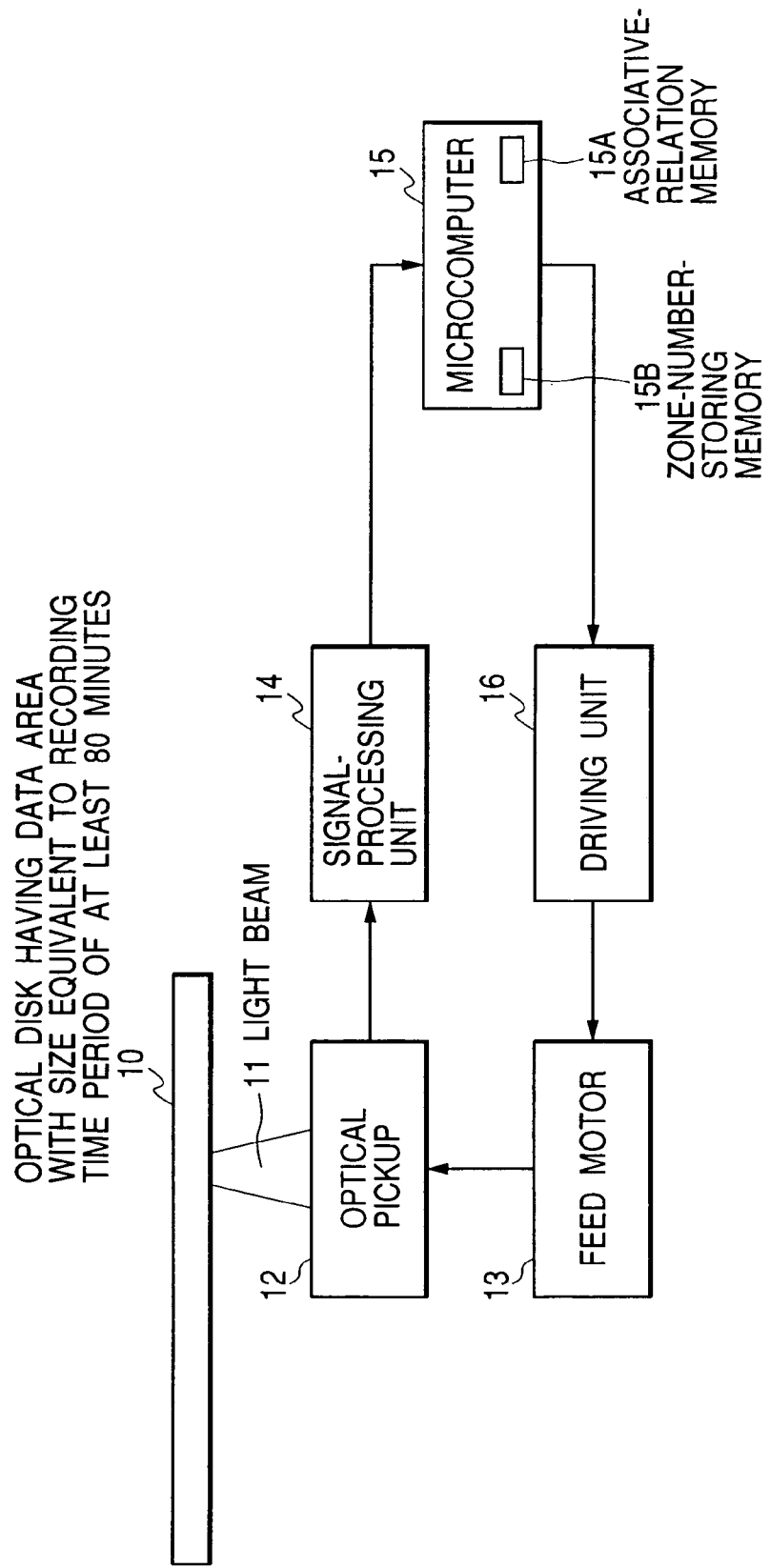
FIG. 1 is a diagram showing the configuration of an optical storage device according to an embodiment of the present invention.

FIG. 1 is a diagram showing the configuration of an optical storage device according to an embodiment of the present invention. The optical storage device shown in FIG. 1 comprises an optical pickup 12, a slide motor 13, a signal-processing unit 14, a microcomputer 15 and a driving unit 16. The optical pickup 12 is a component for radiating a light beam 11 to an optical disk 10 having a total data area with a size equivalent to a recording time period of at least 80 minutes and receiving a light beam reflected by the optical disk 10. In addition, by radiating the light beam 11, the optical pickup 12 is capable of recording information onto the optical disk 10. The slide motor 13 is a component for moving the optical pickup 12. The signal-processing unit 14 is a component for inputting ATIP time information, with which the optical disk 10 is carved. The microcomputer 15 is a component for making a decision to carry out a seek operation on the basis of the ATIP time information. The driving unit 16 is a component for driving the slide motor 13 in accordance with a command received from the microcomputer 15. The microcomputer 15 includes an associative-relation table memory 15A and a zone-number-storing memory 15B.

Figure 2:
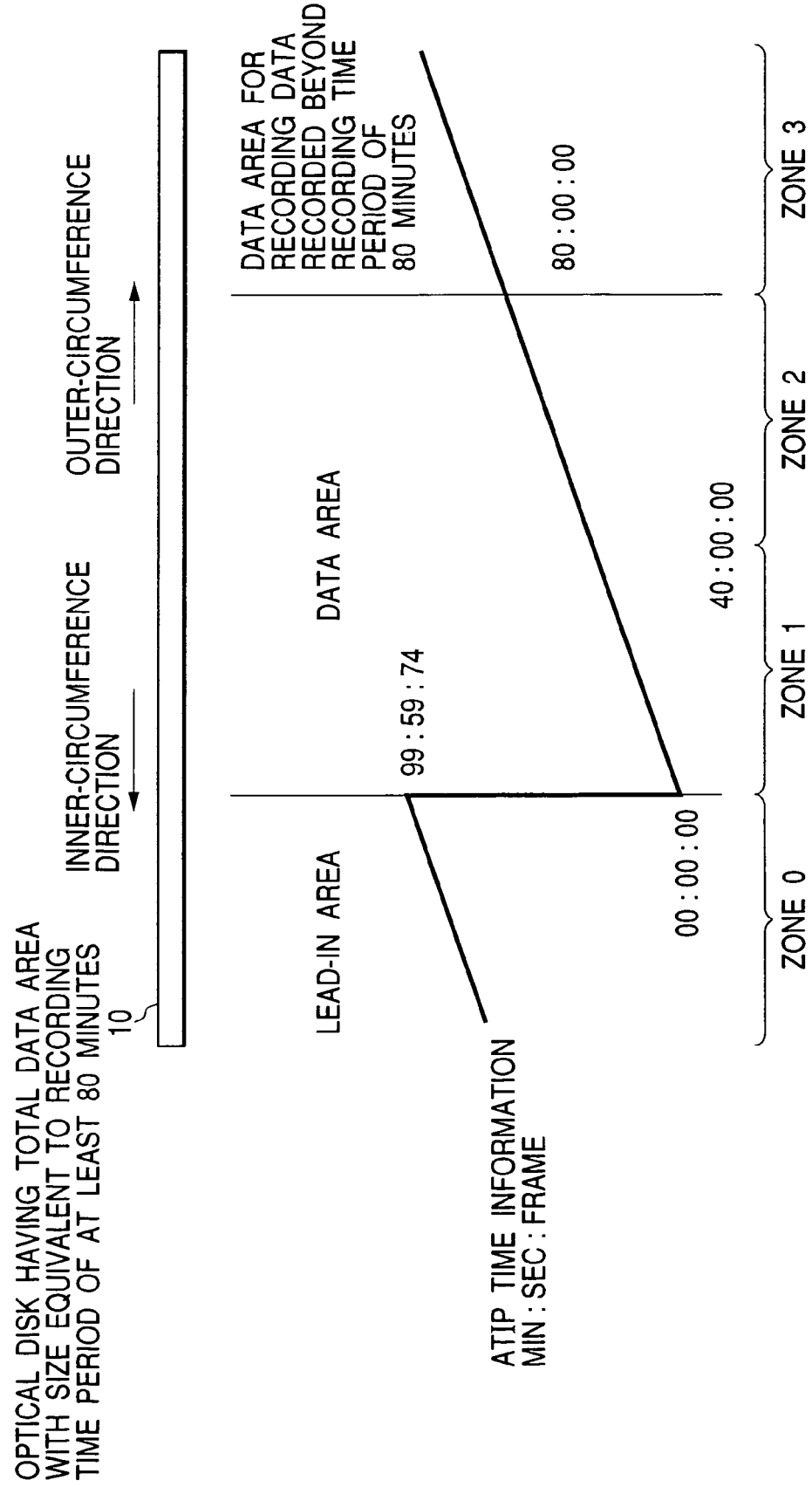
FIG. 2 is a diagram showing a relation between an optical disk 10 having a total data area with a size equivalent to a recording time period of at least 80 minutes and zones defined by the embodiment implementing the optical storage device in the embodiment.

The associative-relation table memory 15A and the zone-number-storing memory 15B are explained below. FIG. 2 is a diagram showing a relation between an optical disk 10 having a total data area with a size equivalent to a recording time period of at least 80 minutes and zones defined by the embodiment implementing the optical storage device in the embodiment.

The optical disk 10 having a total data area with a size equivalent to a recording time period of at least 80 minutes has a lead-in area, a middle data area and a data area for recording data recorded beyond a recording time period of 80 minutes. In the following description, the data area for recording data recorded beyond a recording time period of 80 minutes is referred to simply as a data area beyond a recording time period of 80 minutes. The middle data area is divided into an inner-side data area and an outer-side data area. Thus, the lead-in area, the inner-side data area, the outer-side data area and the data area beyond a recording time period of 80 minutes form 4 linked zones 0, 1, 2 and 3, i.e., zones identified by the zone numbers 0, 1, 2 and 3 respectively. To be more specific, the lead-in area is also referred to as zone 0, the inner-side data area is also referred to as zone 1, the outer-side data area is also referred to as zone 2 and the data area beyond a recording time period of 80 minutes is also referred to as zone 3. These associative relations are recorded in the associative-relation table memory 15A of the configuration shown in FIG. 1 for a management purpose.

In other words, zone numbers 0 and 3 are assigned to the zone on the innermost side and the zone on the outermost side. The zone on the innermost side has ATIP time information undistinguishable from the ATIP time information of the zone on the outermost side. Zone numbers 1 and 2 are assigned to the zones associated with respectively the inner-side data area and the outer-side data area, which form the middle data area. These associative relations are recorded in the associative-relation table memory 15A of the configuration shown in FIG. 1 for a management purpose.

In this case, the ATIP time information has the format of MIN (minutes): SEC (seconds): FRAME (frames). The MIN, SEC and FRAME fields are each a 2-digit number. The ATIP time information of zone 0 cannot be distinguished from the ATIP time information of zone 3.

Zone 0 cited above further includes an entire area on a side inner than the lead-in area. The entire area on the side inner than the lead-in area comprises a PMA (Program Memory Area) on a side right inner than the lead-in area and a PCA (Power Calibration Area) on a side inner than the PMA. The lead-in area is an area used for a TOC (Table of Contents) containing information on tracks, where a track is a recording unit of the data area. The PMA is an area used for recording management information of the data area. The PCA is an area used for calibration of a laser power.

Zone 1 cited above serves as the inner-side data area having ATIP time information in the range 00:00:00 to 39:59:74. Zone 2 cited above serves as the outer-side data area having ATIP time information in the range 40:00:00 to 79:59:74. Zone 3 cited above serves as the data area beyond a recording time period of 80 minutes.

The middle data area can also divided into more than two zones because the middle data area is wide. In addition, the border time between zones identified by the zone numbers 1 and 2 does not have to be 40:00:00. It is desirable, however, to have a border time at a position as close to the center of the middle area as possible.

Next, the zone-number-storing memory 15B is explained below. The zone-number-storing memory 15B is a memory location used for managing the position of the optical pickup 12 by using the zones described above. When the position of the optical pickup 12 is changed from a zone, say zone 0 to a next zone, say zone 1, for example, the microcomputer 15 updates the contents of the zone-number-storing memory 15B from the zone number 0 to 1.

In this embodiment, the lead-in area has ATIP time information undistinguishable from the ATIP time information of the data area beyond a recording time period of 80 minutes, and these areas are recognized by discrimination from the middle data area by using the associative-relation table memory 15A and the zone-number-storing memory 15B. As described earlier, the associative-relation table memory 15A is a table used for recording relations associating the lead-in area, the inner-side data area, the outer-side data area and the data area beyond a recording time period of 80 minutes with the zones identified by the zone numbers 0, 1, 2 and 3 respectively. On the other hand, the zone-number-storing memory 15B is a memory location used for managing the position of the optical pickup 12 by using the zones.

Figure 3:
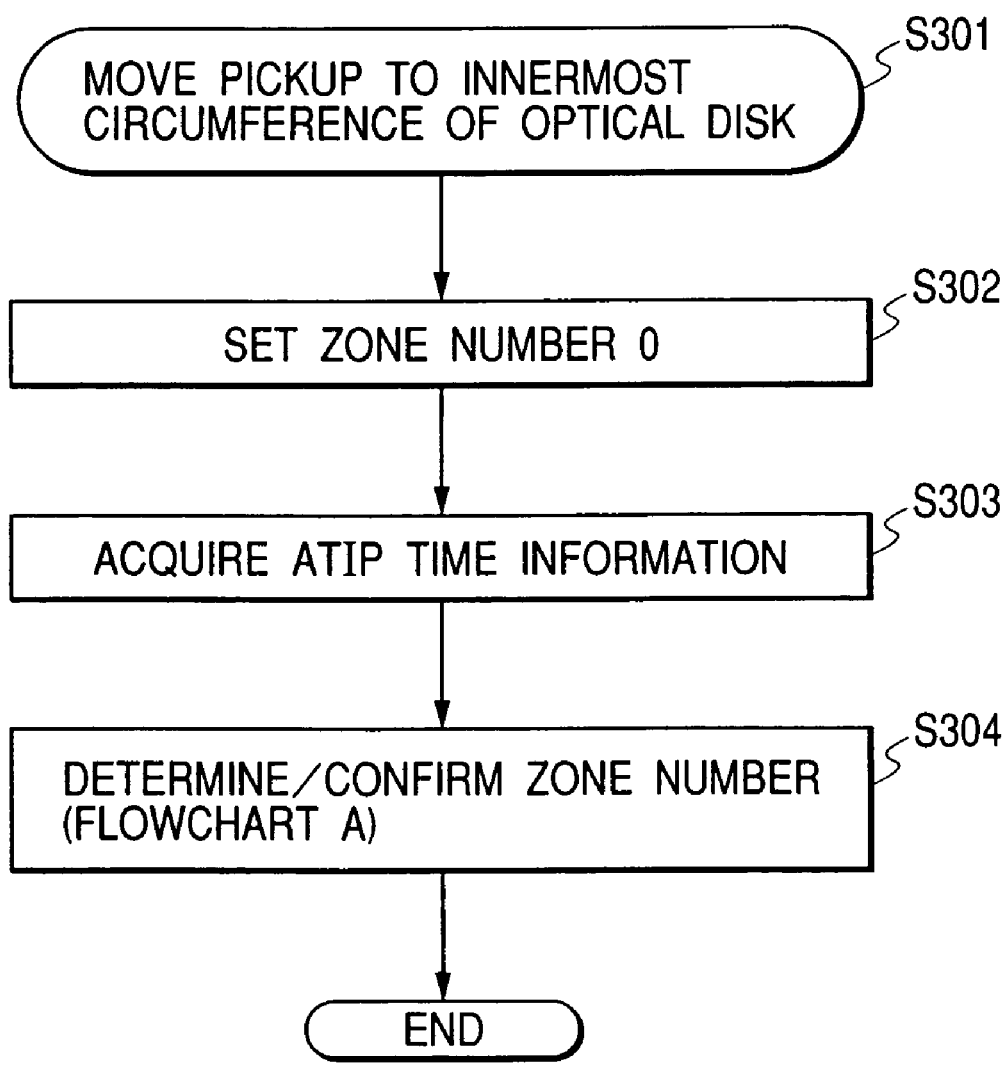
FIG. 3 shows a flowchart representing a sequence of operations carried out to determine a zone number to be stored in a zone-number-storing memory 15B of the optical storage device shown in FIG. 1 during initialization of the zone number in the zone-number-storing memory 15B and upon movement of an optical pickup 12 in the radial direction of the optical disk 10.

FIG. 3 shows a flowchart representing a sequence of operations carried out to determine a zone number to be stored in the zone-number-storing memory 15B of the optical storage device shown in FIG. 1 or confirm a zone number already stored in the zone-number-storing memory 15B during initialization of the zone number in the zone-number-storing memory 15B and upon a movement of the optical pickup 12 in the radial direction of the optical disk 10.

The flowchart begins with a step 301 at which the slide motor 13 is driven in accordance with a command issued by the microcomputer 15 to move the optical pickup 12 to the innermost circumference of the optical disk 10. Then, at the next step 302, the microcomputer 15 stores the zone number 0 in the zone-number-storing memory 15B as the number of the innermost-circumference zone in which the optical pickup 12 is currently positioned, that is, resets the zone number stored in the zone-number-storing memory 15B to 0. Subsequently, at the next step 303, the slide motor 13 is driven in accordance with a command issued by the microcomputer 15 to move the optical pickup 12 to an outer circumference. The optical pickup 12 then reads out ATIP time information embedded in the optical disk 10 and supplies the information to the signal-processing unit 14. Then, at the next step 304, the microcomputer 15 determines a zone on the outer circumference by using the ATIP time information read out from the optical disk 10.

Figure 4:
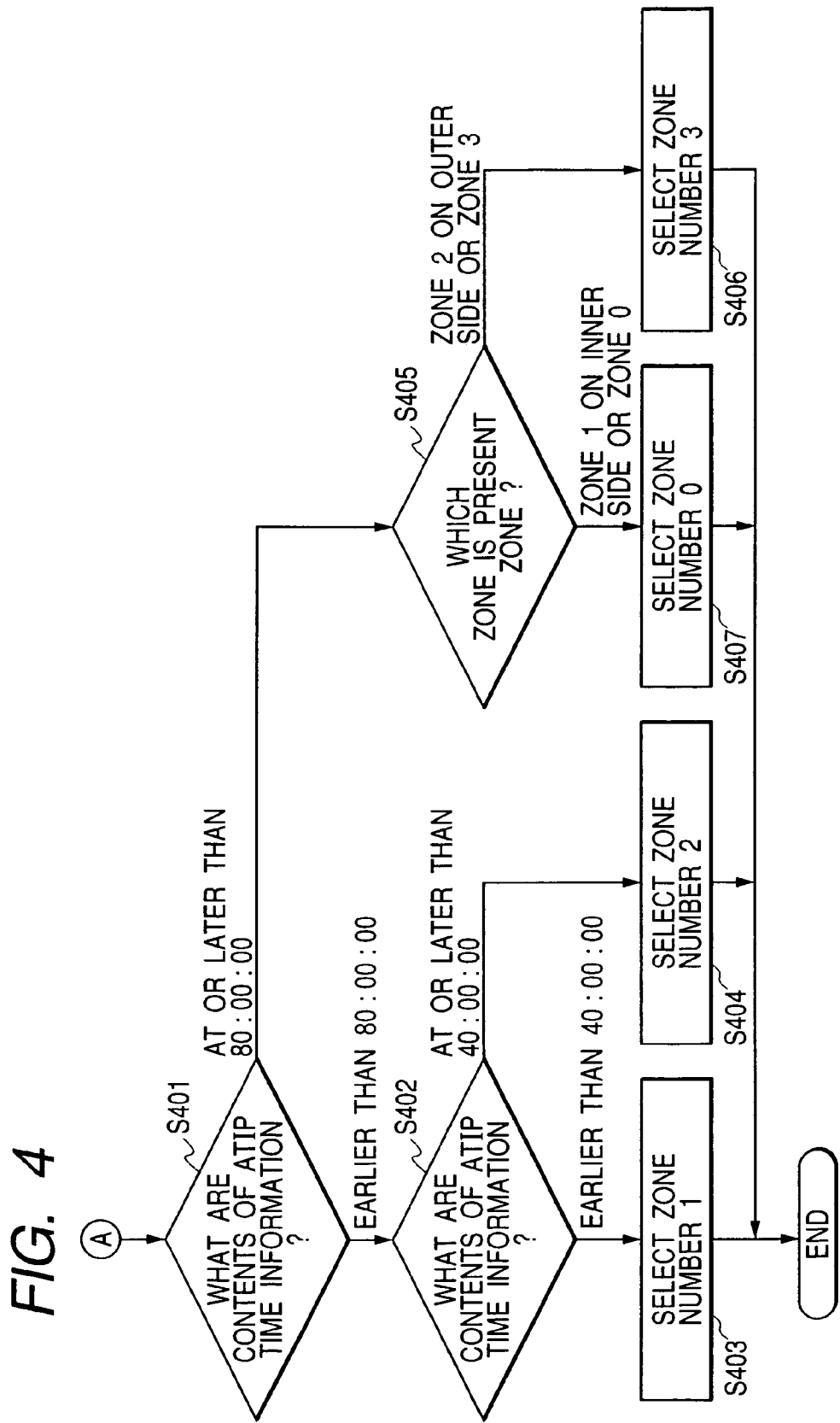
FIG. 4 shows a flowchart A representing a sequence of concrete operations carried out at a step 304 of the flowchart shown in FIG. 3 to determine a zone number.

FIG. 4 shows a flowchart A representing a sequence of concrete operations carried out at the step 304 of the flowchart shown in FIG. 3 to determines a zone.

The flowchart begins with a step 401 at which the microcomputer 15 examines the ATIP time information read out from the optical disk 10 as information on the present position of the optical pickup 12 to determine whether or hot the information is earlier than, coincides with or is later than 80:00:00. If the ATIP time information is earlier than 80:00:00, the flow of the operation sequence goes on to a step 402 at which the microcomputer 15 further examines the ATIP time information to determine whether or not the information is earlier than, coincides with or is later than 40:00:00. If the ATIP time information is earlier than 40:00:00, the flow of operation sequence goes on to a step 403 at which the microcomputer 15 determines the zone to be zone 1. If the ATIP time information coincides with or is later than 40:00:00, on the other hand, the flow of operation sequence goes on to a step 404 at which the microcomputer 15 determines the zone to be zone 2.

If the determination result obtained at the step 401 indicates that the ATIP time information coincides with or is later than 80:00:00, on the other hand, the flow of operation sequence goes on to a step 405 at which the microcomputer 15 determines whether the optical pickup 12 is positioned on an inner or outer circumference of the optical disk 10 by referring to a zone number stored in the zone-number-storing memory 15B. The zone number 2 or 3 stored in the zone-number-storing memory 15B indicates that the optical pickup 12 is positioned on an outer circumference of the optical disk 10. In this case, the flow of operation sequence goes on to a step 406 at which the microcomputer 15 determines the zone to be zone 3. On the other hand, the zone number 0 or 1 stored in the zone-number-storing memory 15B as shown by a determination result obtained at the step 405 indicates that the optical pickup 12 is positioned on an inner circumference of the optical disk 10. In this case, the flow of operation sequence goes on to a step 407 at which the microcomputer 15 determines the zone to be zone 0.

A zone determined at the step 407 of the above flowchart as a zone identified by the zone number 0 is the lead-in area of the optical disk 10 in accordance with the associative-relation table memory 15A of the configuration shown in FIG. 1. In this case, the microcomputer 15 confirms the zone number 0 already stored in the zone-number-storing memory 15B or changes the zone number stored therein from 1 to 0. A zone determined at the step 403 of the above flowchart as a zone identified by the zone number 1 is the inner-side data area of the optical disk 10 in accordance with the associative-relation table memory 15A of the configuration shown in FIG. 1. In this case, the microcomputer 15 stores the zone number 1 in the zone-number-storing memory 15B. A zone determined at the step 404 of the above flowchart as a zone identified by the zone number 2 is the outer-side data area of the optical disk 10 in accordance with the associative-relation table memory 15A of the configuration shown in FIG. 1. In this case, the microcomputer 15 stores the zone number 2 in the zone-number-storing memory 15B. A zone determined at the step 406 of the above flowchart as a zone identified by the zone number 3 is the data area included in the optical disk 10 as a data area beyond a recording time period of 80 minutes in accordance with the associative-relation table memory 15A of the configuration shown in FIG. 1. In this case, the microcomputer 15 confirms the zone number 3 already stored in the zone-number-storing memory 15B or changes the zone number stored therein from 2 to 3.

That is to say, the associative-relation table memory 15A of the configuration shown in FIG. 1 shows a relation assigning a zone number to each of the lead-in area, inner-side data area, outer-side data area and data area beyond a recording time period of 80 minutes in the optical disk 10. Thus, an operation to seek for a position on the optical disk 10 can be carried out by using the zone numbers.

Figure 5:
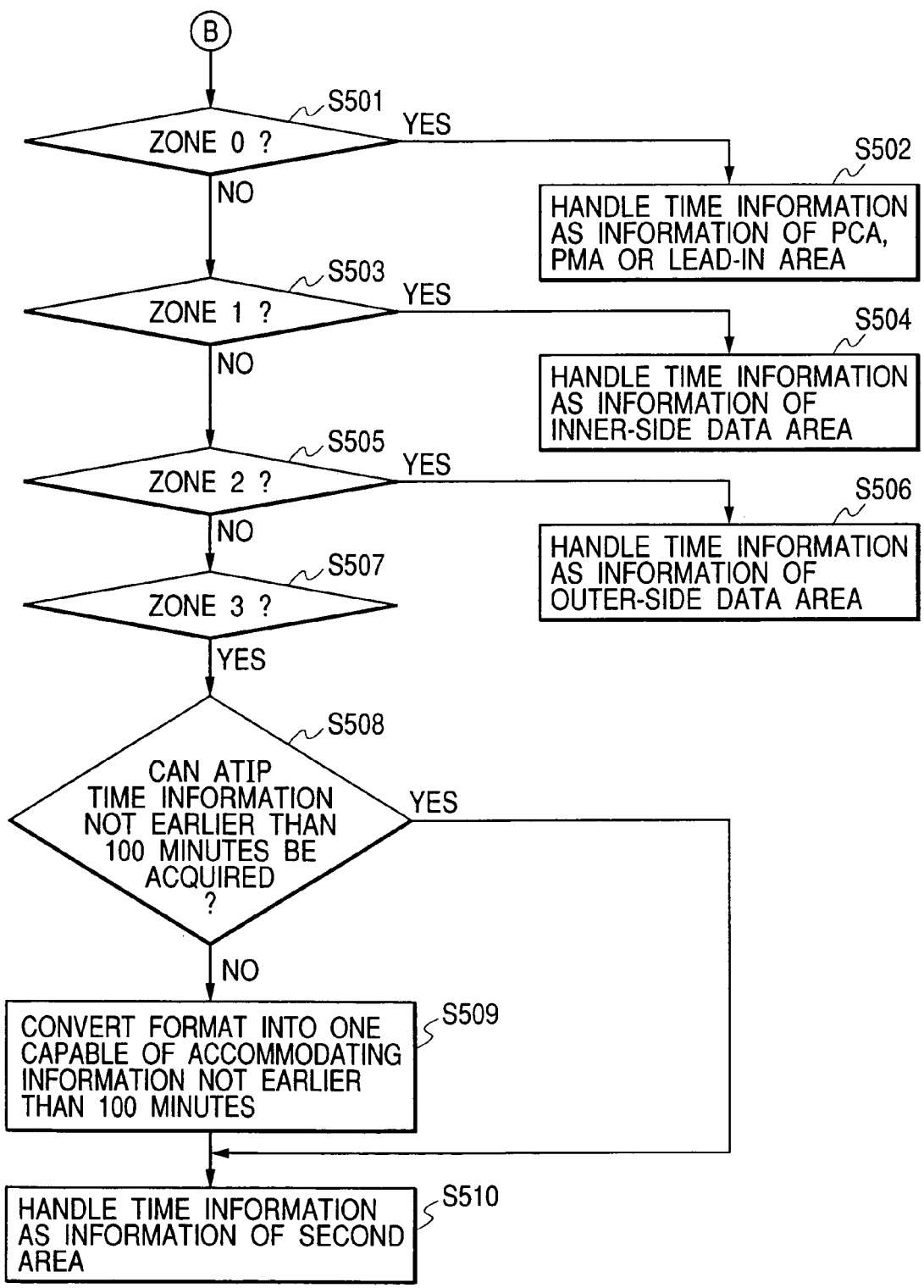
FIG. 5 shows a flowchart B representing a sequence of operations carried out by a microcomputer employed in the optical storage device shown in FIG. 1 to process ATIP time information acquired by a signal-processing unit employed in the same optical storage device for each zone determined in the operations represented by the flowchart shown in FIG. 4.

FIG. 5 shows a flowchart B representing a sequence of operations carried out by the microcomputer 15 employed in the optical storage device shown in FIG. 1 to process ATIP time information acquired by the signal-processing unit 14 employed in the same optical storage device for each of the zones determined in the operations represented by the flowchart shown in FIG. 4.

The flowchart begins with a step 501 at which the microcomputer 15 determines whether or not the determined zone is zone 0. If the determined zone is zone 0, the flow of the operation sequence goes on to a step 502 at which the signal-processing unit 14 handles the ATIP time information acquired thereby as time information of the PCA, the PMA or the lead-in area. If the determination result obtained at the step 501 indicates that the determined zone is not zone 0, on the other hand, the flow of the operation sequence goes on to a step 503 at which the microcomputer 15 determines whether or not the determined zone is zone 1. If the determined zone is zone 1, the flow of the operation sequence goes on to a step 504 at which the signal-processing unit 14 handles the ATIP time information acquired thereby as time information of the inner-side data area. If the determination result obtained at the step 503 indicates that the determined zone is not zone 1, on the other hand, the flow of the operation sequence goes on to a step 505 at which the microcomputer 15 determines whether or not the determined zone is zone 2. If the determined zone is zone 2, the flow of the operation sequence goes on to a step 506 at which the signal-processing unit 14 handles the ATIP time information acquired thereby as time information of the outer-side data area. If the determination result obtained at the step 505 indicates that the determined zone is not zone 2, on the other hand, the flow of the operation sequence goes on to a step 507 at which the microcomputer 15 determines whether or not the determined zone is zone 3.

If the determination result obtained at the step 507 indicates that the determined zone is zone 3, the flow of the operation sequence goes on to a step 508 to determine whether or not ATIP time information not earlier than a recording time of 100 minutes can be acquired. If ATIP time information not earlier than the recording time of 100 minutes was acquired, the flow of the operation sequence goes on to a step 509 at which the microcomputer 15 or the onboard signal-processing unit 14 converts the ATIP time information expressed in the conventional BCD (Binary Coded Decimal) format into ATIP time information expressed in the binary format capable of representing a recording time of at least 100 minutes. The ATIP time information is converted by carrying out a process like one shown in FIG. 6, which shows a way to convert ATIP time information expressed in the conventional BCD format into ATIP time information expressed in a binary format capable of representing a recording time of at least 100 minutes. Then, at the next step 510, the ATIP time information is handled as time information of the data area beyond a recording time period of 80 minutes. If the determination result obtained at the step 508 indicates that ATIP time information for a recording time of at least 100 minutes cannot be acquired, on the other hand, the flow of the operation sequence goes on directly to the step 510 at which the ATIP time information is handled as time information of a data area beyond a recording time period of 80 minutes without conversion of the information.

By the way, in the computation of the radial distance of the present position, the distance of a seek operation or other quantities in the conventional optical storage device, ATIP time information of the PCA, the PMA and the lead-in area is used by converting the information into a negative value. For example, 99:59:73 (Minute Second: Frame) is converted into −00:00:02. On the other hand, the positive value of ATIP time information for a data area is used as it is.

The above description has explained a relation recorded in the associative-relation table memory 15A employed in the configuration shown in FIG. 1 as a relation associating areas of the optical disk 10 with zones provided by the present invention. Next, a seek operation is described.

Figure 7:
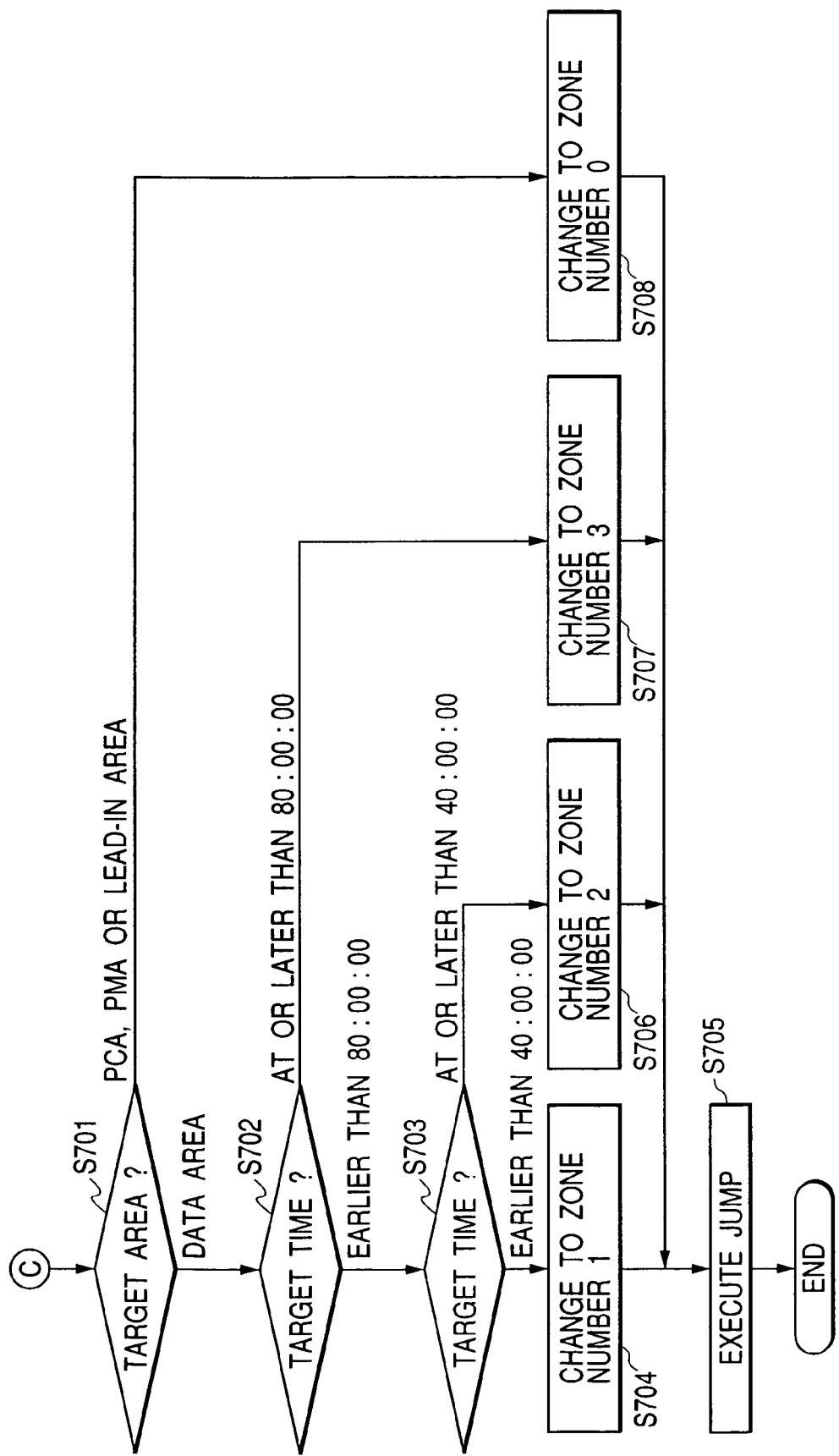
FIG. 7 shows a flowchart C representing a sequence of operations carried out by the embodiment to perform a seek operation.

FIG. 7 shows a flowchart C representing a sequence of operations carried out by the embodiment to perform a seek operation. The flowchart begins with a step 701 at which the microcomputer 15 determines whether the area having the target ATIP time information of a seek destination is a data area, the PCA, the PMA or the lead-in area on the basis of a seek command signal received from an external source not shown in FIG. 1. If the area is a data area, the flow of the operation sequence goes on to a step 702 at which the microcomputer 15 determines whether or not the target time is earlier than, coincides with or is later than 80:00:00. If the target time is earlier than 80:00:00, the flow of the operation sequence goes on to a step 703 at which the microcomputer 15 further examines the target time to determine whether or not the target time is earlier than, coincides with or is later than 40:00:00.

If the determination result obtained at the step 703 indicates that the target time is earlier than 40:00:00, the flow of operation sequence goes on to a step 704 at which the zone number recorded in the zone-number-storing memory 15B is changed to the zone number 1 in accordance with the associative relation recorded in the associative-relation table memory 15A. Then, the flow of operation sequence goes on to a step 705 at which a jump operation is carried out.

If the determination result obtained at the step 703 indicates that the target time coincides with or is later than 40:00:00, on the other hand, the flow of operation sequence goes on to a step 706 at which the zone number recorded in the zone-number-storing memory 15B is changed to the zone number 2 in accordance with the associative relation recorded in the associative-relation table memory 15A. Then, the flow of operation sequence goes on to the step 705 at which a jump operation is carried out.

If the determination result obtained at the step 702 indicates that the target time coincides with or is later than 80:00:00, on the other hand, the flow of operation sequence goes on to a step 707 at which the zone number recorded in the zone-number-storing memory 15B is changed to the zone number 3 in accordance with the associative relation recorded in the associative-relation table memory 15A. Then, the flow of operation sequence goes on to the step 705 at which a jump operation is carried out.

If the determination result obtained at the step 701 indicates that the target area is the PCA, the PMA or the lead-in area, on the other hand, the flow of operation sequence goes on to a step 708 at which the zone number recorded in the zone-number-storing memory 15B is changed to the zone number 0 in accordance with the associative relation recorded in the associative-relation table memory 15A. Then, the flow of operation sequence goes on to the step 705 at which a jump operation is carried out.

In the jump (seek) operation carried out at the step 705, the microcomputer 15 drives the slide motor 13 to move the optical pickup 12 to an area included in the optical disk 10 as an area indicated by the changed zone number. The optical pickup 12 then moves to the area included in the optical disk 10 as an area indicated by the changed zone number. The microcomputer 15 keeps driving the slide motor 13 to move the optical pickup 12 till ATIP time information corresponding to the target position is received from the signal-processing unit 14. As ATIP time information corresponding to the target position is received from the signal-processing unit 14, the microcomputer 15 ends the seek operation.

Figure 8:
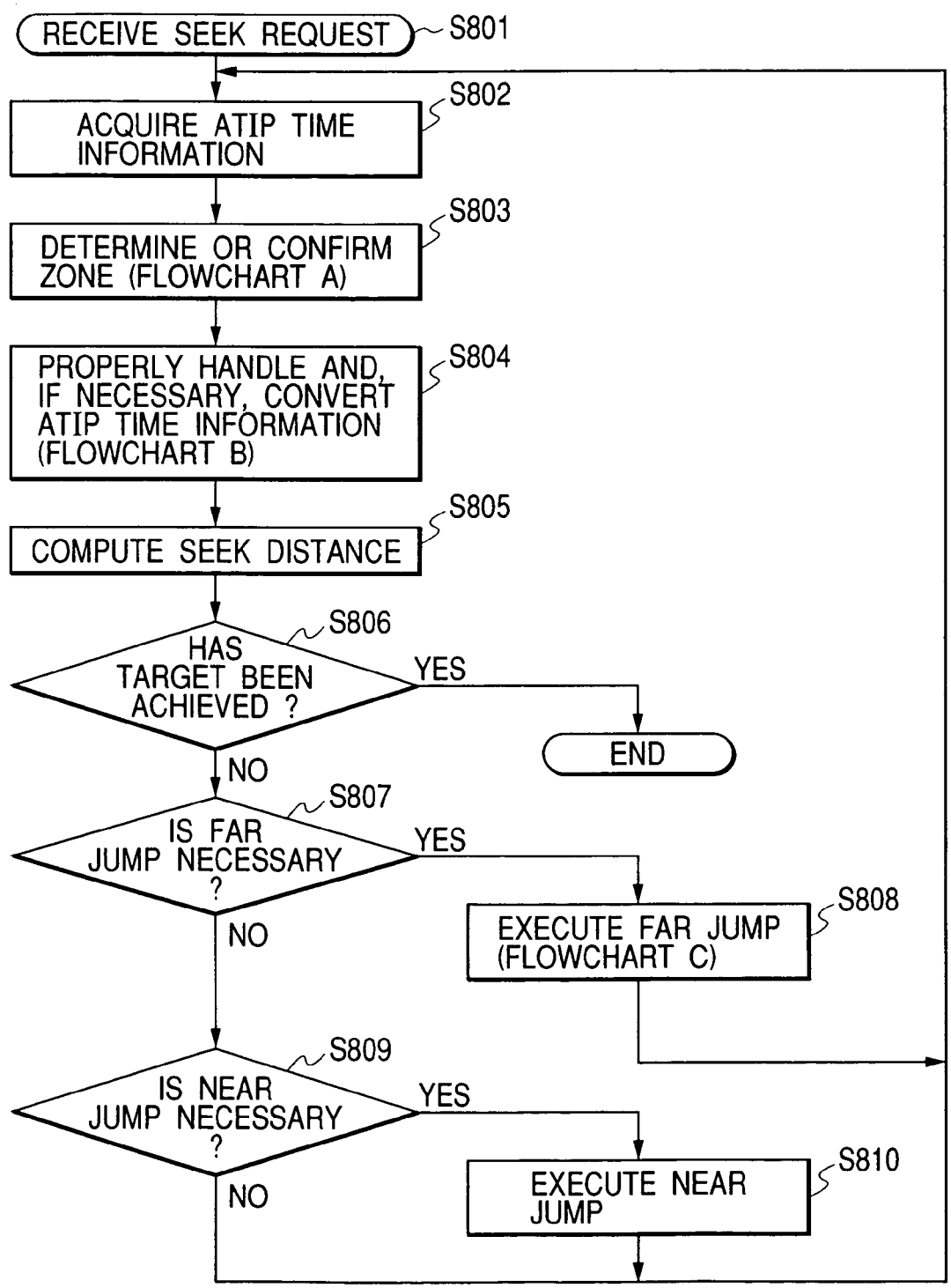
FIG. 8 shows a flowchart representing a complete sequence of operations carried out by the optical storage device implemented by the embodiment.

FIG. 8 shows a flowchart representing a complete sequence of operations carried out by the optical storage device according to the embodiment. The flowchart begins with a step 801 at which the microcomputer 15 recognizes the existence of a request for a seek operation or receives such a request. Then, at the next step 802, the optical pickup 12 reads out information such as the ATIP time information of the present position on the optical disk 10 from the optical disk 10 and supplies the information to the signal-processing unit 14.

Subsequently, at the next step 803, a process according to the flowchart A shown in FIG. 4 is carried out to determine the zone number to be recorded in the zone-number-storing memory 15B of the configuration shown in FIG. 1 or confirm the zone number already recorded in the zone-number-storing memory 15B as a zone number for the lead-in area, inner-side data area, outer-side data area or data area beyond a recording time period of 80 minutes on the optical disk 10 in accordance with the ATIP time information.

Then, at the next step 804, the microcomputer 15 carries out a process according to the flowchart B shown in FIG. 5, if necessary, with reference to the information conversion way shown in FIG. 6 to handle the ATIP time information received by the signal-processing unit 14 as time information of an area identified by the zone number.

Subsequently, at the next step 805, the microcomputer 15 computes a seek distance from the ATIP time information received by the signal-processing unit 14 as the time information of the present position and the ATIP time information of the target position.

Then, at the next step 806, the microcomputer 15 determines whether or not the computation result obtained at the step 805 indicates that the ATIP time information of the present position matches the ATIP time information of the target position. If the ATIP time information of the present position matches the ATIP time information of the target position, the seek operation is ended.

If the ATIP time information of the present position does not match the ATIP time information of the target position, on the other hand, the flow of the operation sequence goes on to a step 807 at which the microcomputer 15 determines whether or not a far jump is needed on the basis of the computation result obtained at the step 805. In this case, if the seek distance obtained as a result of computation at the step 805 is at least equal to a first predetermined value set in advance, a far jump is deemed to be a necessary jump If the seek distance is shorter than the first predetermined value, on the other hand, a far jump is not deemed to be a necessary jump.

If a far jump is deemed to be a necessary jump at the step 807, the flow of the operation sequence goes on to a step 808 at which a process according to the flowchart C shown in FIG. 7 is carried out. In the case of a far jump, a seek operation is carried out across a plurality of zones. As shown in the flowchart C of FIG. 7, a jump is made after the zone number recorded in the zone-number-storing memory 15B of the configuration shown in FIG. 1 is changed to a zone number indicating a zone of the seek destination having the target time information. Thus, the optical pickup 12 can be moved with a high degree of precision to an area included in the optical disk 10 as an area including the seek destination having the target time information. Accordingly, a seek operation to a target in any area can be carried out with a high degree of precision.

After the process according to the flowchart C shown in FIG. 7 is carried out at the step 808, the flow of the operation sequence goes back to the step 802. As the microcomputer 15 determines that the ATIP time information of the present position matches the ATIP time information of the target position at the step 806, the seek operation is ended.

If a far jump is not deemed to be a necessary jump at the step 807, on the other hand, the flow of the operation sequence goes on to a step 809 at which the microcomputer 15 determines whether or not a near jump is needed on the basis of the computation result obtained at the step 805. In this case, a near jump is a jump to be carried out if the seek distance obtained as a result of computation at the step 805 is shorter than the first predetermined value.

If a near jump is deemed to be a necessary jump at the step 809, the flow of the operation sequence goes on to a step 810 at which the jump is made. The optical pickup 12 is moved in the near jump. After the microcomputer 15 confirms a zone crossed over by using ATIP time information received by the signal-processing unit 14, the microcomputer 15 changes the zone number recorded in the zone-number-storing memory 15B of the configuration shown in FIG. 1 to a next zone number.

If ATIP time information coinciding with 80:00:00 or ATIP time information later than 80:00:00 is received, however, the zone number is changed in accordance with rules for changing a zone number on the basis of the pre-change zone number as follows:

(1) If the pre-change zone number is the zone number 1, the zone number is changed to the zone number 0.

(2) If the pre-change zone number is the zone number 2, the zone number is changed to the zone number 3.

After the near jump is made at the step 810, the flow of the operation sequence goes back to the step 802. As the microcomputer 15 determines that the ATIP time information of the present position matches the ATIP time information of the target position at the step 806, the seek operation is ended.

As described above, in accordance with the embodiment of the present invention, in an optical disk having a total data area with a size equivalent to a recording time period of at least 80 minutes, a seek operation to a target in any area can be carried out with a high degree of precision. Thus, data can be written additionally into a data area beyond a recording time period of 80 minutes.

It is to be noted that, in the optical storage device employing a stepping motor as the slide motor 13 for moving the optical pickup 12 as shown in FIG. 1, the optical pickup 12 may be stopped in the course of a jump due to above mentioned irregularity phenomenon occurring in the stepping motor during a seek operation. Accordingly, the microcomputer 15 misinterprets ATIP time information received by the signal-processing unit 14 as the ATIP time information of the post-jump position. As a result, there is raised a problem that the seek operation is not carried out correctly.

Assume for example that an irregularity phenomenon occurs right after the start of a seek operation from the lead-in area associated with zone 0 to a position of 98:00:00 in zone 3 representing the data area beyond a recording time period of 80 minutes in the optical disk 10 divided into four zones as shown in FIG. 2.

If an irregularity phenomenon occurs, the optical pickup 12 can hardly be moved. Thus, in this case, the optical pickup 12 is still positioned in the lead-in area. Since the zone number stored in the zone-number-storing memory 15B has been changed from 0 to 3 at the start of the seek operation, however, the microcomputer 15 mistakenly interprets the ATIP time information received by the signal-processing unit 14 as ATIP time information for zone 3 after the occurrence of the irregularity phenomenon. Thus, the microcomputer 15 ends the seek operation with the optical pickup 12 settled at a position of 98:00:00 in the lead-in area at the end of the trace. This incorrect interpretation may also happen to a reversed seek operation from zone 3 to zone 0. It is thus desirable to avoid a malfunction occurring in a seek operation due to such an irregularity phenomenon.

Figure 9:
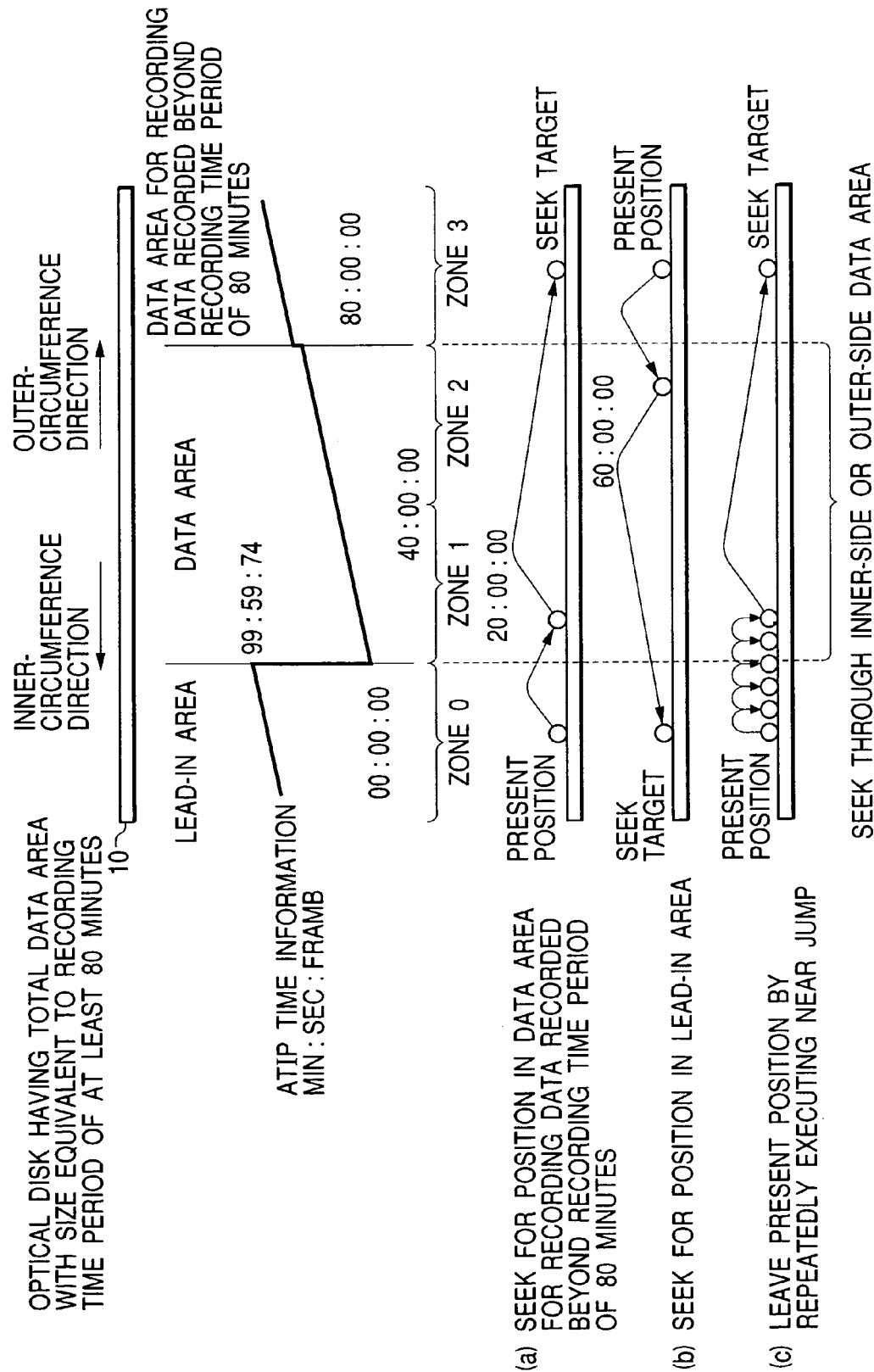
FIG. 9 is an explanatory diagram referred to in describing an optical storage device implemented by another embodiment capable of avoiding a malfunction occurring in a seek operation due to above mentioned irregularity phenomenon.

FIG. 9 is an explanatory diagram referred to in describing an optical storage device implemented by another embodiment capable of avoiding a malfunction occurring in a seek operation due to an irregularity phenomenon. That is to say, FIG. 9 is an explanatory diagram showing a case in which a seek operation is carried out at two stages to move the optical pickup 12 between positions in the lead-in area, the PMA or the PCA and the data area beyond a recording time period of 80 minutes.

To be more specific, an (a) diagram of FIG. 9 shows a seek operation from zone 0 representing the lead-in area, the PMA and the PCA to zone 3 representing the data area beyond a recording time period of 80 minutes. In this case, the optical pickup 12 is first jumped from zone 0 to the center position of intermediate zone 1 provided adjacently to zone 0 to represent the inner-side data area at the first stage. The signal-processing unit 14 receives ATIP time information and the microcomputer 15 confirms the fact that the ATIP time information is information for an intermediate position of 20:00:00 in the inner-side data area and the fact that the optical pickup 12 has been moved out from zone 0. Then, the optical pickup 12 is moved again from the center position of zone 1 to the data area beyond a recording time period of 80 minutes at the second stage.

On the contrary, a (b) diagram of FIG. 9 shows a reversed seek operation from zone 3 representing the data area beyond a recording time period of 80 minutes to zone 0 representing the lead-in area, the PMA and the PCA. In this case, the optical pickup 12 first is jumped from zone 3 representing the data area beyond a recording time period of 80 minutes to the center position of intermediate zone 2 provided adjacently to zone 3 to represent the outer-side data area at the first stage. The signal-processing unit 14 receives ATIP time information and the microcomputer 15 confirms the fact that the ATIP time information is information for an intermediate position of 60:00:00 in the outer-side data area and the fact that the optical pickup 12 has been moved out from zone 3. Then, the optical pickup 12 is moved again from the center position of zone 2 to zone 0 representing the lead-in area, the PMA and the PCA at the second stage.

A (c) diagram of FIG. 9 shows a seek operation from zone 0 representing the lead-in area, the PMA and the PCA to zone 3 representing the data area beyond a recording time period of 80 minutes. In this case, first of all, a near jump is made repeatedly and the ATIP position information for the position serving as the target of each near jump is confirmed. As the ATIP position information confirms the fact that the optical pickup 12 has been moved out from zone 0, an operation is carried out to seek for the target position in the data area beyond a recording time period of 80 minutes.

Figure 10:
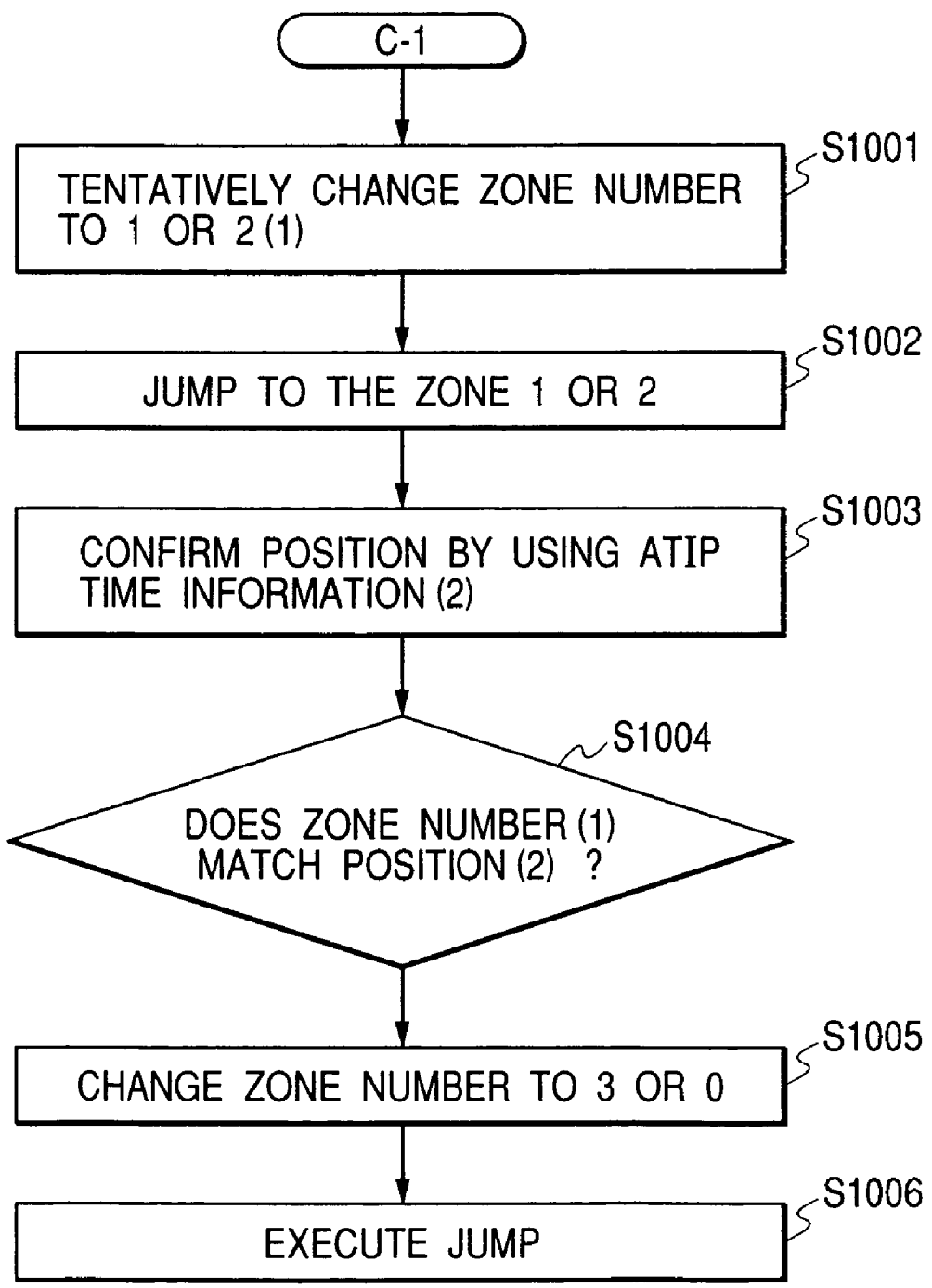
FIG. 10 shows a flowchart representing a sequence of main operations carried out by another embodiment implementing an optical storage device capable of coping with irregularity.

FIG. 10 shows a flowchart C-1 representing a sequence of main operations carried out by another embodiment implementing an optical storage device capable of coping with irregularity. The flowchart C-1 shown in FIG. 10 represents a sequence of main operations carried out at the step 808 of the flowchart shown in FIG. 8.

In this case, the optical pickup 12 does not jump directly from zone 0 representing the lead-in area to a destination in zone 3 representing the data area beyond a recording time period of 80 minutes or from zone 3 to a destination in zone 0 representing the lead-in area. Thus, the C-1 flowchart begins with a step 1001 at which the zone number stored in the zone-number-storing memory 15B is changed from 0 to 1 or from 3 to 2.

Then, at the next step 1002, the optical pickup 12 is jumped to intermediate zone 1 or 2. Subsequently, at the next step 1003, the signal-processing unit 14 acquires post-jump ATIP time information and the microcomputer 15 examines the information to confirm the fact that the optical pickup 12 has been jumped correctly to a position serving as an intermediate destination.

Then, at the next step 1004, the zone number 1 or 2 newly set at the step 1001 is collated with the position indicated by the ATIP time information as the intermediate destination confirmed at the step 1003 to determine whether or not the newly set zone number agrees with the confirmed intermediate destination. If the newly set zone number agrees with the confirmed intermediate destination, the flow of the operation sequence goes on to a step 1005 at which the zone number stored in the zone-number-storing memory 15B is changed to 3 or 0 to represent a zone of the final jump destination. Subsequently, at the next step 1006, a jump is made.

Thus, in accordance with this embodiment, it is possible to carry out a seek operation from zone 0 representing the lead-in area to zone 3 representing a data area beyond a recording time period of 80 minutes or from zone 3 to zone 0 with a high degree of reliability.

Figure 11:
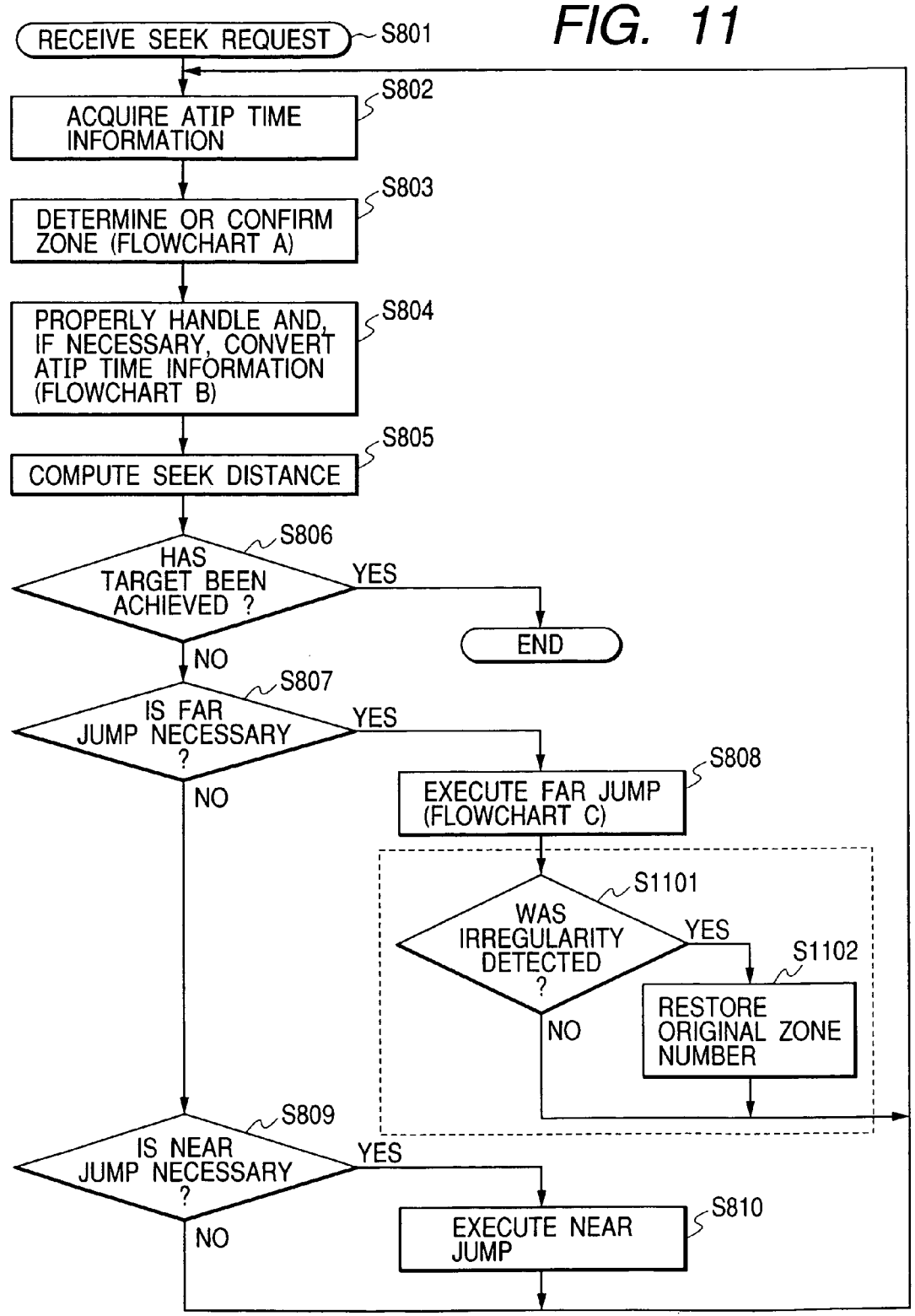
FIG. 11 shows a flowchart representing a sequence of operations carried out by an optical storage device implemented by another embodiment as an optical storage device having an irregularity detection unit not shown in FIG. 1.

FIG. 11 shows a flowchart representing a sequence of operations carried out by an optical storage device according to another embodiment as an optical storage device having an irregularity detection unit not shown in FIG. 1. Steps included in the flowchart shown in FIG. 11 as steps identical with their counterparts in the flowchart shown in FIG. 8 are denoted by the same number as the counterparts and the descriptions of the identical steps are not repeated.

After the operations are carried out at the step 808 to make a far jump, the flow of the operation sequence goes on to a step 1101 at which the microcomputer 15 determines whether or not an irregularity has been detected. If an irregularity has not been detected, the flow of the operation sequence goes back to the step 802. If an irregularity has been detected, on the other hand, the flow of the operation sequence goes on to a step 1102 at which the recorded zone number is restored to the pre-jump zone number and then the flow of the operation sequence goes back to the step 802. As the microcomputer 15 determines that the ATIP time information of the present position matches the ATIP time information of the target position at the step 806, the seek operation is ended.

Thus, even if an irregularity phenomenon occurs, a problem of the seek operation can be prevented from rising.

What is claimed is:

1. A seek method of an optical disk including a first area, a second area with time information undistinguishable from time information of said first area and a third area with unique time information, comprising the steps of:

handling said third area as a plurality of sub-areas;

managing each of said first area, said sub-areas and said second area as a zone identified by using one of different zone numbers recorded in an associative-relation table memory;

storing a zone number assigned to a zone of the present position of an optical pickup or a zone number assigned to a zone of a target position serving as a seek destination of said optical pickup in a zone-number-storing memory; and changing, before a seek operation is carried out to move said optical pickup, the zone number stored in said zone-number-storing memory as a zone number assigned to a zone of the present position of said optical pickup to the zone number assigned to a zone of a target position serving as a seek destination of said optical pickup, implementing said seek operation to move said optical pickup to the zone identified by said zone number newly stored in said zone-number-storing memory, and ending said seek operation when said optical pickup arrives at said target position serving as said seek destination in the zone identified by said newly stored zone number.

2. A seek method of an optical disk in accordance with claim 1 wherein, before a seek operation is carried out to move said optical pickup from a present position in said first area to a target position serving as a seek destination in said second area, the zone number stored in said zone-number-storing memory as a zone number assigned to said first area of said present position of said optical pickup is first changed to the zone number assigned to said second area of said target position serving as said seek destination of said optical pickup and, then, said seek operation is actually implemented to move said optical pickup to said second area identified by said zone number newly stored in said zone-number-storing memory and, as said optical pickup arrives at said target position serving as said seek destination in said second area identified by said newly stored zone number, said seek operation is finished.

3. A seek method of an optical disk in accordance with claim 1 wherein, before a seek operation is carried out to move said optical pickup from a present position in said second area to a target position serving as a seek destination in said first area, the zone number stored in said zone-number-storing memory as a zone number assigned to said second area of said present position of said optical pickup is first changed to the zone number assigned to said first area of said target position serving as said seek destination of said optical pickup and, then, said seek operation is actually implemented to move said optical pickup to said first area identified by said zone number newly stored in said zone-number-storing memory and, as said optical pickup arrives at said target position serving as said seek destination in said first area identified by said newly stored zone number, said seek operation is finished.

4. A seek method provided for an optical disk in accordance with claim 1 wherein:

a zone number 0 is assigned to said first area;

zone numbers 1 to M are assigned to said M sub-areas respectively where M is the number of said sub-areas composing said third area; and a zone number N is assigned to said second area.

5. A seek method of an optical disk in accordance with claim 4 wherein, before a seek operation is carried out to move said optical pickup from a present position in said first area to a target position serving as a seek destination in said second area, said zone number 0 stored in said zone-number-storing memory as a zone number assigned to said first area of said present position of said optical pickup is first changed to said zone number N assigned to said second area of said target position serving as said seek destination of said optical pickup and, then, said seek operation is actually implemented to move said optical pickup to said second area identified by said zone number N newly stored in said zone-number-storing memory and, as said optical pickup arrives at said target position serving as said seek destination in said second area identified by said newly stored zone number N, said seek operation is finished.

6. A seek method provided for an optical disk in accordance with claim 4 wherein, before a seek operation is carried out to move said optical pickup from a present position in said second area to a target position serving as a seek destination in said first area, said zone number N stored in said zone-number-storing memory as a zone number assigned to said second area of said present position of said optical pickup is first changed to said zone number 0 assigned to said first area of said target position serving as said seek destination of said optical pickup and, then, said seek operation is actually implemented to move said optical pickup to said first area identified by said zone number 0 newly stored in said zone-number-storing memory and, as said optical pickup arrives at said target position serving as said seek destination in said first area identified by said newly stored zone number 0, said seek operation is finished.

7. An optical storage device carrying out a seek operation to move an optical pickup to a desired position on an optical disk having a first area, a second area with time information undistinguishable from time information of said first area and a third area with unique time information, said optical storage device comprising:

an associative-relation table memory for recording different zone numbers assigned to zones representing said first and second areas and a plurality of sub-areas obtained as a result of dividing said third area;

a zone-number-storing memory for storing a zone number assigned to a zone of the present position of said optical pickup or a zone number assigned to a zone of a target position serving as a seek destination of said optical pickup for the purpose of managing the position of said optical pickup; and a controller configured to execute control wherein, before a seek operation is carried out to move said optical pickup, the zone number stored in said zone-number-storing memory as a zone number assigned to a zone of the present position of said optical pickup is first changed to the zone number assigned to a zone of a target position serving as a seek destination of said optical pickup and, then, said seek operation is actually implemented to move said optical pickup to a zone identified by said zone number newly stored in said zone-number-storing memory and, as said optical pickup arrives at said target position serving as said seek destination in said zone identified by said newly stored zone number, said seek operation is finished.

8. A seek method of an optical disk having a first area, a second area with time information undistinguishable from time information of said first area and a third area with unique time information, comprising the steps of:

handling said third area into a plurality of sub-areas;

managing each of said first area, said sub-areas and said second area as a zone identified by using one of different zone numbers recorded in an associative-relation table memory;

storing a zone number assigned to a zone of the present position of an optical pickup or a zone number assigned to a zone of a target position serving as a seek destination of said optical pickup in a zone-number-storing memory; and carrying out a seek operation to move said optical pickup by executing the steps of:

changing the zone number stored in said zone-number-storing memory as a zone number assigned to a seek-origin zone of the present position of said optical pickup to a particular zone number assigned to a zone adjacent to said seek-origin zone;

moving said optical pickup to said adjacent zone identified by said particular zone number newly stored in said zone-number-storing memory at a first seek stage;

confirming the fact that said optical pickup has been moved out from said seek-origin zone identified by said zone number stored in said zone-number-storing memory before being changed to said particular zone number;

changing the zone number stored in said zone-number-storing memory as said particular zone number assigned to said adjacent zone of a new present position of said optical pickup to a specific zone number assigned to a zone of a target position serving as a seek destination of said optical pickup;

moving said optical pickup to said zone of said target position serving as said seek destination at a second seek stage; and finishing said seek operation as said optical pickup arrives at said target position serving as said seek destination in said zone identified by said specific zone number newly stored in said zone-number-storing memory.

9. A seek method of an optical disk in accordance with claim 8 wherein a seek operation is carried out to move said optical pickup from the present position in said first area to the target position serving as a seek destination in said second area by executing the steps of:

changing the zone number stored in said zone-number-storing memory as a zone number assigned to said first area of said present position of said optical pickup to a particular zone number assigned to a sub-area adjacent to said first area;

moving said optical pickup to said adjacent sub-area identified by said particular zone number newly stored in said zone-number-storing memory at a first seek stage;

confirming the fact that said optical pickup has been moved out from said first area identified by said zone number stored in said zone-number-storing memory before being changed to said particular zone number;

changing the zone number stored in said zone-number-storing memory as said particular zone number assigned to said adjacent sub-area of a new present position of said optical pickup to a specific zone number assigned to said second area of said target position serving as said seek destination of said optical pickup;

moving said optical pickup to said second area of said target position serving as said seek destination at a second seek stage; and finishing said seek operation as said optical pickup arrives at said target position serving as said seek destination in said second area identified by said specific zone number newly stored in said zone-number-storing memory.

10. An optical storage device carrying out a seek operation to move an optical pickup to a desired position on an optical disk having a first area, a second area with time information undistinguishable from time information of said first area and a third area with unique time information, said optical storage device comprising:

an associative-relation table memory for recording different zone numbers assigned to zones representing said first and second areas and a plurality of sub-areas obtained as a result of dividing said third area;

a zone-number-storing memory for storing a zone number assigned to a zone of the present position of said optical pickup or a zone number assigned to a zone of a target position serving as a seek destination of said optical pickup for the purpose of managing the position of said optical pickup; and a controller configured to execute control wherein a seek operation to move said optical pickup is carried out by executing the steps of:

changing the a zone number stored in said zone-number-storing memory as a zone number assigned to a seek-origin zone of the present position of said optical pickup to a particular zone number assigned to a zone adjacent to said seek-origin zone;

moving said optical pickup to said adjacent zone identified by said particular zone number newly stored in said zone-number-storing memory at a first seek stage;

confirming the fact that said optical pickup has been moved out from said seek-origin zone identified by said zone number stored in said zone-number-storing memory before being changed to said particular zone number;

changing the zone number stored in said zone-number-storing memory as said particular zone number assigned to said adjacent zone of a new present position of said optical pickup to a specific zone number assigned to a zone of a target position serving as a seek destination of said optical pickup;

moving said optical pickup to said zone of said target position serving as said seek destination at a second seek stage; and finishing said seek operation as said optical pickup arrives at said target position sewing as said seek destination in said zone identified by said specific zone number newly stored in said zone-number-storing memory.

11. A seek method of an optical disk in accordance with any one of claims 1, 2, 3, 4, 5, 6, 8 and 9 wherein:

said optical disk is an optical disk having a storage size equivalent to a recording time period of at least 80 minutes;

said first area is an area including a lead-in area, a PMA and a PCA;

said third area is a data area for recording data recorded within a recording time period of 80 minutes; and said second area is a data area for recording data recorded beyond said recording time period of 80 minutes;

said first area has time information undistinguishable from time information of said second area; and said third area has unique time information.

12. An optical storage device in accordance with any one of claims 7 or 10 wherein:

said optical disk is an optical disk having a storage size equivalent to a recording time period of at least 80 minutes;

said first area is an area including a lead-in area, a PMA and a PCA;

said third area is a data area for recording data recorded within a recording time period of 80 minutes; and said second area is a data area for recording data recorded beyond said recording time period of 80 minutes;

said first area has time information undistinguishable from time information of said second area; and said third area has unique time information.

* * * * *